(12) United States Patent
Oldani et al.

(10) Patent No.: US 7,731,816 B2
(45) Date of Patent: Jun. 8, 2010

(54) SYSTEM AND METHOD FOR HEATING CARBON FIBER USING INFRARED RADIATION IN A FIBER PLACEMENT MACHINE

(75) Inventors: Tino Oldani, Rockford, IL (US); Daniel Goebel, Roscoe, IL (US)

(73) Assignee: Ingersoll Machine Tools, Inc., Rockford, IL (US)

( * ) Notice: Subject to any disclaimer, the term of this patent is extended or adjusted under 35 U.S.C. 154(b) by 632 days.

(21) Appl. No.: 11/675,130

(22) Filed: Feb. 15, 2007

(65) Prior Publication Data

US 2007/0187021 A1  Aug. 16, 2007

Related U.S. Application Data

(60) Provisional application No. 60/773,816, filed on Feb. 16, 2006.

(51) Int. Cl.
*B32B 37/00* (2006.01)
*B65H 81/00* (2006.01)

(52) U.S. Cl. .................. 156/175; 156/169; 156/172; 156/173; 156/272.2; 156/425; 156/433; 156/441

(58) Field of Classification Search ............ 156/169, 156/172, 173, 175, 272.2, 425, 433, 441
See application file for complete search history.

(56) References Cited

U.S. PATENT DOCUMENTS

| | | | |
|---|---|---|---|
| 3,278,722 A * | 10/1966 | Fannon, Jr. et al. | ......... 392/424 |
| 3,448,253 A | 6/1969 | Brambett, II et al. | |
| 3,673,028 A | 6/1972 | Pearson | |
| 3,769,127 A | 10/1973 | Goldsworthy et al. | |
| 3,786,233 A * | 1/1974 | Bumpus et al. | ............. 392/416 |
| 4,714,509 A * | 12/1987 | Gruber | ................... 156/272.2 |
| 4,872,619 A | 10/1989 | Vaniglia | |

(Continued)

FOREIGN PATENT DOCUMENTS

DE     2361415 A1 *  6/1975

(Continued)

OTHER PUBLICATIONS

Russell Devlieg et al., High-Speed Fiber Placement on Large Complex Structures, paper, 2007, 5 pages, 2007-01-3843.

(Continued)

*Primary Examiner*—Jeff H Aftergut
(74) *Attorney, Agent, or Firm*—Reinhart Boerner Van Deuren P.C.

(57) ABSTRACT

An apparatus comprising a fiber placement head assembly and an infrared heating assembly is provided. The fiber placement head assembly includes a compaction roller assembly and a feeder assembly. An infrared heating assembly, a cooling mechanism, temperature sensors, and a controller are operably coupled to the fiber placement head assembly. The infrared heating assembly includes an infrared heater that generates a heating profile. The heating profile defines a heating zone on either a tool or previously laid tows. If the burn point of either the tool or previously laid tows within the heating zone is approached, the controller, which receives temperature readings from the temperature sensors, simultaneously disables the infrared heater and activates the cooling mechanism. As such, the tool and the previously laid tows are protected from being ruined due to an over temperature condition.

12 Claims, 4 Drawing Sheets

U.S. PATENT DOCUMENTS

| | | | |
|---|---|---|---|
| 4,943,338 A | 7/1990 | Wisbey | |
| 5,022,952 A | 6/1991 | Vaniglia | |
| 5,072,359 A | 12/1991 | Kneifel, II | |
| 5,078,821 A | 1/1992 | Garvey et al. | |
| 5,110,395 A | 5/1992 | Vaniglia | |
| 5,145,543 A | 9/1992 | Redd et al. | |
| 5,177,340 A * | 1/1993 | Zaffiro | 219/494 |
| 5,200,018 A | 4/1993 | Gill et al. | |
| 5,223,072 A | 6/1993 | Brockman et al. | |
| 5,239,457 A | 8/1993 | Steidle et al. | |
| 5,273,602 A | 12/1993 | Gill et al. | |
| 5,645,677 A | 7/1997 | Cahuzac et al. | |
| 5,651,850 A | 7/1997 | Turner et al. | |
| 5,700,347 A * | 12/1997 | McCowin | 156/425 |
| 5,979,531 A | 11/1999 | Barr et al. | |
| 6,073,670 A | 6/2000 | Koury | |
| 6,096,164 A | 8/2000 | Benson et al. | |
| 6,112,792 A | 9/2000 | Barr et al. | |
| 6,752,190 B1 * | 6/2004 | Boll et al. | 156/433 |
| 6,968,883 B2 | 11/2005 | Torres Martinez | |
| 2002/0170938 A1 | 11/2002 | Shea et al. | |
| 2003/0034111 A1 | 2/2003 | Oldenburg et al. | |
| 2003/0052212 A1 | 3/2003 | Anderson et al. | |
| 2003/0201060 A1 | 10/2003 | Hauber | |
| 2003/0209312 A1 | 11/2003 | Hauber | |
| 2005/0039842 A1 | 2/2005 | Clark et al. | |
| 2005/0039843 A1 | 2/2005 | Johnson et al. | |
| 2005/0236735 A1 | 10/2005 | Oldani et al. | |
| 2005/0240291 A1 | 10/2005 | Oldani et al. | |
| 2005/0269016 A1 | 12/2005 | Oldani et al. | |
| 2006/0006157 A1 | 1/2006 | Oldani | |
| 2008/0157437 A1 * | 7/2008 | Nelson et al. | 264/405 |

FOREIGN PATENT DOCUMENTS

| | | |
|---|---|---|
| EP | 0167377 | 1/1986 |
| EP | 1132193 | 9/2001 |

OTHER PUBLICATIONS

European Search Report; European Application No. EP 07 00 3312; Place of search—The Hague; Date of completion of the search—May 30, 2007; 2 pages.

Rick Calawa and John Nancarrow; Medium Wave Infrared heater for High-Speed Fiber Placement; SAE International Article 07ATC-251; Copyright © '2007; 5 pages.

* cited by examiner

US 7,731,816 B2

SYSTEM AND METHOD FOR HEATING CARBON FIBER USING INFRARED RADIATION IN A FIBER PLACEMENT MACHINE

CROSS-REFERENCE TO RELATED PATENT APPLICATIONS

This patent application claims the benefit of U.S. Provisional Patent Application No. 60/773,816, filed Feb. 16, 2006, the entire teachings and disclosure of which are hereby incorporated in their entireties by reference thereto.

FIELD OF THE INVENTION

This invention generally relates to fiber placement machinery, and more particularly to methods and apparatuses used in such fiber placement machinery to heat the fiber laid thereby.

BACKGROUND OF THE INVENTION

Automated fiber placement machines are widely used to manufacture parts, components and structures from composite material. The materials used in automated fiber placement are typically composed of longitudinal fibers and resin consolidated into tapes, or thin strips, commonly known as "tows." Anywhere from a single tow to several of the tows arranged side-by-side are fed out of the fiber placement machine as the fiber placement machine lays and compacts a "ply" or "course" over and onto a tool. The number of tows released by the fiber placement machine and placed over and onto the tool depends on several factors, including, for example, the size, dimensions, shape, and contour of the tool. As each ply or course is laid upon a previously laid and compacted ply or course, a composite part is built up and formed, in layer-by-layer fashion, upon the tool.

The automated fiber placement process generally described above enables the construction of complex composite structures having steered or curvilinear fiber paths. This method of producing composite structures is more cost effective than manual methods. It also provides an improved structural efficiency due to its ability to orient the fibers along local internal loads paths, which potentially results in lighter and stronger structures and a lower cost of making the part when compared to structures made by other production methods.

During the automated fiber placement process, the tows are typically heated as they are being laid over and onto the tool or over a previous layer of tows. The heat supplied to the tows causes them to become tacky (a.k.a., sticky). When tacky, the individual tows bond and join together with adjacent or proximate tows to form a cohesive ply or composite part.

Unfortunately, the fiber placement machinery today is limited in its use partially due to the inability to quickly heat the tool or the carbon fiber tows proximate the point of application and compaction. Previous methods of heating require complex, expensive assemblies and use the heat transfer method of convection. Blowing hot air in the direction of the tool or the previously laid tows is a somewhat effective heating method, but it is slow reacting and is much more difficult to control.

The invention provides a system and method of heating the tool or the previously laid tows proximate the point of application and compaction without the associated problems and drawbacks existing with the current methods and apparatuses. These and other advantages of the invention, as well as additional inventive features, will be apparent from the description of the invention provided herein.

BRIEF SUMMARY OF THE INVENTION

In one aspect, a heating apparatus, system and method that may be used with a fiber placement machine to quickly heat a tool or previously laid tows proximate an application area or a point of compaction is provided. The heating is provided by an infrared (IR) heater. Such a system and method is inexpensive, quick to react, easy to control, and requires fewer assembly components compared to conventional systems.

The proposed new system and method of compaction heating will allow overall performance improvements and cost reductions in the fiber placement industry. Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
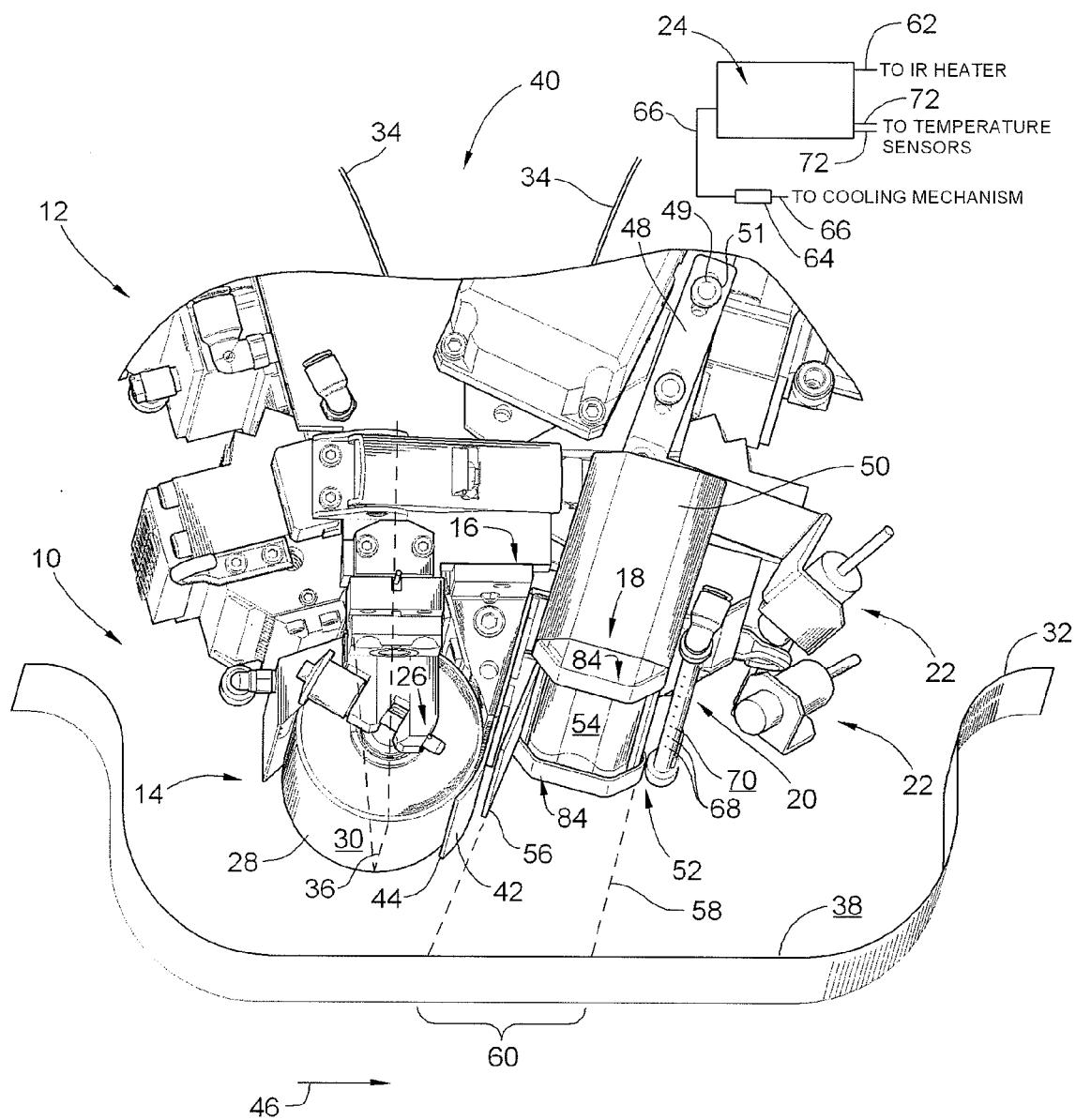
FIG. 1 is a perspective view of an exemplary embodiment of a fiber placement head assembly constructed in accordance with one embodiment of the present invention, the fiber placement head assembly including an infrared (IR) heating assembly and operably coupled to a fiber placement machine that has been generally schematically illustrated.

As illustrated in FIG. 1, a fiber placement head assembly 10 for a fiber placement machine 12 constructed in accordance with one embodiment of the present invention is shown. Although not shown, the fiber placement machine 12 is operably coupled to a gantry or other mechanically moveable structure such that the fiber placement head assembly 10 can be steered in a number of directions and maneuvered in several different directions. As will be more fully explained below, an infrared (IR) heating source operably coupled to the fiber placement head assembly 10 supplies heat during a fiber placement operation in a simple and inexpensive manner compared to conventional fiber placement head assemblies that rely on the heat transfer method of convection for heating.

As shown in FIG. 1, in one embodiment the fiber placement head assembly 10 includes, among numerous other assemblies and subassemblies, a compaction roller assembly 14 and a feeder assembly 16. An infrared heating assembly 18, which includes an infrared heater 52, a cooling mechanism 20, and temperature sensors 22, is operably coupled to the fiber placement head assembly 10. A controller 24 is operably coupled to infrared heating assembly 18 and, in one embodiment, the fiber placement head assembly 10 as well.

The compaction roller assembly 14 includes a pair of spaced apart mounts 26 that operably couple the compaction roller assembly 14 to the fiber placement head assembly 10. In between the mounts 26, a freely rotatable compaction roller 28 is seated. In the illustrated embodiment, the compaction roller 28 has a generally smooth outer surface 30. As will be more fully explained below, the compaction roller 28 is utilized to forcibly press tows 34, which are fed out from the feeder assembly 16, against a tool 32 or tows that have been previously laid over the tool (see FIG. 3).

As shown in FIG. 1, compaction of the tows 34 between the tool 32 and the compaction roller 28 will occur along or proximate a compaction line 36 on the outer surface 30 of the roller 28. In one embodiment, as the fiber placement head assembly 10 lays the tows 34 on or over the tool 32, the fiber placement head assembly 10 remains generally normal to a surface 38 of the tool 32 disposed directly beneath the compaction line 36 as the contour of the surface changes.

Adjacent to the compaction roller assembly 14 is a feeder assembly 16. Like the compaction roller assembly 14, the feeder assembly 16 is operably coupled to the fiber placement head assembly 10. The feeder assembly 16 generally delivers one or a plurality of tows 34 to the compaction roller assembly 14 and, in particular, the compaction roller 28. The tows 34 are generally composed of longitudinal fibers and resin consolidated into tapes or thin strips. In one embodiment, each of the tows 34 has a width of approximately one eighth of an inch. Even so, tows 34 of other materials and having other widths may be employed to accommodate the size, shape, and contour of the tool 32 upon which the strips are being applied or the composite part being formed.

In the illustrated embodiment of FIG. 1, the feeder assembly 16 takes two separate groups of sixteen tows 34 entering a rear portion 40 of the feeder assembly 16 in different locations and organizes those groups into a band of thirty-two side-by-side, but independent, tows. Then, depending on the size and contour of the composite part being manufactured, anywhere from one to all thirty-two of the tows 34 is paid out by the feeder assembly 16. Upon leaving the feeder assembly 16, the plurality of tows 34 are directed between a guide member 42 and the outer surface 30 of the roller 28.

Because the guide member 42 has an arcuate end portion 44, the tows 34 leaving the feeder assembly 16 are turned toward the compaction line 36 on the outer surface 36 of the compaction roller 28 and in a direction generally opposite the tow application direction 46 of the fiber placement head assembly 10 in FIG. 1.

Adjacent to the feeder assembly 16 is the installed infrared (IR) heating assembly 18. The IR heating assembly 18 is operably coupled to the fiber placement head assembly 10. In the illustrated embodiment, the IR heating assembly 18 is mounted to the fiber placement head assembly 10 using mounting brackets 48 and several threaded members 49 inserted through apertures 51 in the mounting bracket 48 and threadably driven into the fiber placement head assembly. Even so, other mounting structures and assemblies can be employed to support the IR heating assembly 18.

The IR heating assembly 18 includes a shroud 50 or housing that partially covers an infrared (IR) heater 52. In the illustrated embodiment, the exposed portion of the IR heater 52 directed toward the tool 32 has a "peanut-shaped" outer surface 54. As a result of this particular contour of the outer surface 54, and to some extent the guide plate 56, the IR heater 52 has a heating profile 58 (shown in dashed lines) that widens as it progresses away from the IR heater and toward the tool 32 as shown in FIG. 1. Therefore, the IR heater 52 is able to radiantly heat a portion of the tool 32 or previously laid tows 34 within a "heating zone" 60 that extends outside the area located directly in front of the IR heater.

The IR heater 52 is also able to radiantly heat, to some degree, the tows 34 that are ejected from the feeder assembly 16 because of the proximity of the tows 34 to the location of the IR heater 52. For example, if the heating profile 58 shown in FIG. 1 is expanded outwardly, the tows 34 being ejected from the feeder assembly 16 will pass through the heating profile 58 and receive some amount of radiant heating.

The IR heater 52 depicted in the illustrated embodiment of FIG. 1 has a maximum heat output of about two thousand one hundred ninety-two degrees Fahrenheit (2192° F.), which equates to about one thousand two hundred degrees Celsius (1200° C.), when the maximum current and voltage are supplied. In one embodiment the IR heater 52 is employed to raise the temperature of the tool 32 or previously laid tows 34 to between about one hundred degrees Fahrenheit and about five hundred degrees Fahrenheit (100° F.-500° F.), which translates to a range of about thirty-eight degrees Celsius to about two hundred sixty degrees Celsius (38-260° C.). The level of heating depends, in large part, upon the particular object or material being heated, the speed at which the fiber placement head assembly 10 moves relative to the tool 32, the capacity of the IR heater 52, the amount of power supplied to the IR heater 52, and the like. In any case, as will be explained more fully below, the IR heater 52 preferably heats the tool 32 or previously laid tows 34 to a temperature that is less than the "burn point" of the tool or the tows, respectively.

Lead wires 62 leaving the IR heating assembly 18 extend to, and operably couple with, the controller 24. As a result, the controller 24 is in electrical communication with the IR heater 52. Therefore, the controller 24 is not only able to turn the IR heater 52 on and off, but is also able to instruct the IR heater regarding how much heat to generate. For example, in one embodiment the controller 24 delivers a signal of between about four to about twenty milliamps (4 to 20 mA) to the IR heater 52. When the signal is at about four milliamps (4 mA), the IR heater 52 is disabled and generates no heat. As the signal rises above four milliamps, the IR heater 52 is enabled and begins to output a minimum amount of heat. When the signal reaches about twenty milliamps (20 mA), the IR heater 52 outputs a maximum amount of heat.

In one embodiment, the amount of heat generated by the IR heater 52 between the minimum and maximum heat outputs noted above is linearly related to the magnitude of the signal (between four and twenty milliamps) received by the IR heater from the controller 24. For example, when a twelve milliamp (12 mA) signal is received from the controller 24, the IR heater 52 outputs heat at about fifty percent of maximum. Likewise, when a six milliamp (6 mA) signal is received from the controller 24, the IR heater 52 outputs heat at about twenty-five percent of maximum and, when an eighteen milliamp (18 mA) signal is received from the controller, the IR heater outputs heat at about seventy-five percent of maximum.

Despite the above example, the relationship between the amount of heat generated by the IR heater 52 and the magnitude of the signal received from the controller 24 can be something other than linear (e.g., exponential, based on a formula or algorithm, etc.). In addition, the signal need not be a current signal as described above, but instead could be based on another parameter or electrical characteristic (e.g., voltage, frequency, a pulse width modulated signal, etc.).

The signal received by the IR heater 52 from the controller 24 may be a continuous signal or, alternatively, a discontinuous signal. Where a continuous signal (e.g., an analog signal) is utilized, constant modulation of the IR heater 52 between a minimum heat condition and a maximum heat condition is possible. Modulation of the IR heater 52 allows the heat output to be precisely controlled such that the temperature of the tool 32 or tow 34 can also be precisely controlled.

When the IR heater 52 is disabled or turned off after a period of generating radiant heat, a temperature of the IR heater drops to ambient very quickly. In fact, in one embodiment the temperature of the IR heater 52 is reduced from a maximum temperature to that of the ambient in approximately two seconds. Because the IR heater 52 cools off so quickly, radiant heating of the tool 32 or the previously laid tows 34 laying over the tool is discontinued very quickly. This advantage of the IR heater 52 helps to ensure that the "burn point" of either the tool 32 or the tows 34, which is likely very different, is not reached and the composite part being formed by the fiber placement head assembly 10 is not ruined.

Even though the IR heater 52 cools very rapidly, the shroud 50, mounting bracket 48 and other adjacent or proximate components may not cool so quickly and, as a result, will continue to radiate some amount of heat to the tool 32 or previously laid tows 34. This additional heat might, if not dealt with, cause the temperature of the tool 32 or previously laid tows 34 to continue rising toward or past their burn point even though the IR heater 52 has been disabled. To ensure that this does not occur, the cooling mechanism 20 is included within the IR heating assembly 18. In FIG. 1, the cooling mechanism 20 is interposed between the IR heater 52 and the temperature sensors 22. However, the cooling mechanism 20 may also be mounted at other locations in other embodiments.

The cooling mechanism 20 generally operates as an emergency or safety measure that prevents the temperature of the tool 32 or previously laid tows 34 from reaching or rising above their burn point. When activated, the cooling mechanism 20 either maintains or reduces the temperature of the tool 32 or previously laid tows 34. In the illustrated embodiment, the cooling mechanism 20 performs this function by directing a flow of fluid onto and over the heated portion of the tool 32 or previously laid tows 34.

As shown in FIG. 1, the cooling mechanism 20 is operably coupled to a solenoid 64 which is, in turn, coupled to the controller 24 by lead wires 66. When the controller 24 sends the solenoid 64 an energization signal, the solenoid is activated and opens the cooling mechanism 20. The open cooling mechanism 20 directs a flow of fluid onto the tool 32 or previously laid tows 34 such that the temperature of the tool or previously laid tows is maintained or reduced. When the controller 24 terminates the energization signal to the solenoid 64, the solenoid is deactivated and the cooling mechanism 20 closes. The closed cooling mechanism 20 shuts off the flow of fluid.

In the illustrated embodiment, the cooling mechanism 20 is a cooling tube fed by an air supply and having numerous spaced-apart apertures 68 aligned along an outer surface 70 of the cooling tube. The size and number of the apertures 68 can be adjusted to provide the amount of fluid flow desired. As shown, the apertures 68 are generally directed toward the tool 32 or previously laid tows 34 to ensure that when fluid is released in the manner described above, the fluid impinges upon the tool or previously laid tows and removes heat therefrom.

In one embodiment, the fluid expelled by the cooling mechanism 20 is clean, dry ambient air. To ensure that this clean, dry ambient air has the desired relative humidity, the air may be passed through or proximate a desiccant to remove moisture. Also, in lieu of air, other gases (e.g., nitrogen, etc.) can also be expelled from the cooling mechanism 20. In addition, in one embodiment the fluid expelled by the cooling mechanism 20 is cooled to a temperature below ambient. Using this cooled air, heat is more quickly removed from the tool 32 or previously laid tows 34.

Adjacent to the cooling mechanism 20 are the temperature sensors 22. In the illustrated embodiment, a pair of the temperature sensors 22 are shown. Even so, a single temperature sensor or a plurality of temperature sensors could be used in the place of the pair shown. In FIG. 1, the temperature sensors 22 are spaced apart from each other about the width of the shroud 50 covering the IR heater 52. In addition, the temperature sensors 22 are oriented such that they are focused toward the portion of the tool 32 or previously laid tows 34 heated by the IR heater 52.

In the illustrated embodiment, the temperature sensors 22 are positioned such that they are able to detect the hottest portion of the surface area of the tool 32 or previously laid tows 34. In fact, the temperature sensors 22 are configured to measure the average surface temperature of the tool 32 or previously laid tows 34 at the point where the heat is the most intense. In one embodiment, the temperature sensors 22 measure the average surface temperature of about one square inch of the surface 38 of the tool 32 or the surface of the previously laid tows 34.

The temperature sensors 22 are electrically coupled to the controller 24 by lead wires 72. As such, the temperature sensors 22 and the controller 24 are able to communicate with each other. For example, the temperature sensors 22 are able to receive instructions from the controller 24 and relay their temperature measurements to the controller. The temperature sensors 22 are typically energized and operating any time the fiber placement head assembly 10 is being used. Therefore, whether the IR heater 52 is supplying heat to, or the cooling mechanism 20 is removing heat from, the tool 32 or the previously tows 34, the average surface temperature of a portion of the tool 32 or tows 34 laying over the tool 32 is monitored and known.

When the temperature sensors 22 are operating, they are often monitoring the heated portion of the tool 32 or previously laid tows 34 for an over temperature condition. By relaying the monitored information to the controller 24, the controller is able to determine when a surface temperature of the heated portion of the tool 32 or previously laid tows 34 meets or exceeds a predetermined value. This predetermined value, which is input into the controller 24, is generally based upon the burn point of either the tool 32 or the tows 34.

For example, if the burn point of the tows 34 is two hundred degrees Fahrenheit (200° F.), then the predetermined value might be set at one hundred eighty degrees Fahrenheit (180° F.). In any case, the predetermined value may be set to any temperature below the burn point and may be based on a variety of factors. Therefore, the temperature of the tool 32 or previously laid tows 34 should not reach or exceed the burn point while fiber placement head assembly 10 is making composite parts.

Based on desired performance of the heating of the tool 32 and tows 34, the controller 24 can utilize, for example, a proportional, proportional-integral, or proportional-integralderivative type of control. Therefore, the output of the IR heater 52 is taken into account when the input of the IR heater is determined or calculated.

Figure 4:
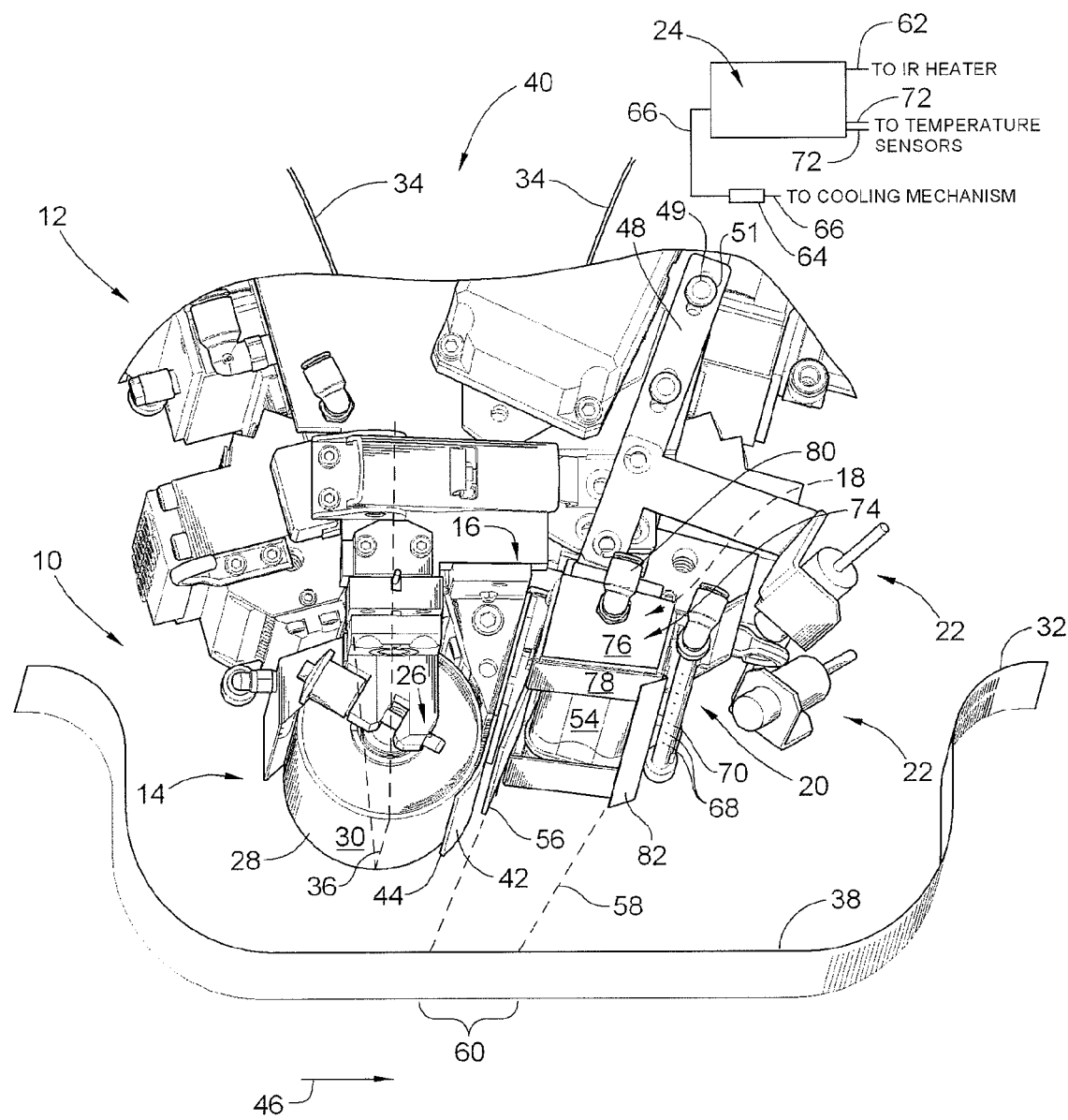
FIG. 4 is a side elevation of the fiber placement head assembly of FIG. 1 laying down tows upon tows that have been previously laid upon the tool.

As shown in FIG. 4, in one embodiment the fiber placement head assembly 10 includes a residual heat distribution assembly 74 operably coupled to the IR heating assembly 18 or the fiber placement head assembly 10. As depicted, the residual heat distribution assembly 74 is generally disposed over a forward portion of the IR heating assembly 18. The residual heat distribution assembly 74 includes a pair of side caps 76 (on either side of the IR heater 52), a cover 78, a pair of quick connects 80 (on either side of the IR heater), and a secondary shroud 82.

The pair of side caps 76 are mounted to, but spaced apart from, forward portions of the shroud 50. Likewise, the cover 78 is mounted to, but spaced apart from, the ends 84 (FIG. 1) of the shroud 50. In this configuration, either side of the shroud 50 is partially covered and somewhat encapsulated such that a cavity 86 is formed between the shroud, the ends 84, and the side caps 76. However, the outer surface 54 of the IR heater 52 remains fully exposed and open to the ambient.

One of the quick connects 80 is operably coupled to and passes through each of the side caps 76. Therefore, when the quick connects 80 are coupled to a gas supply (not shown), the cavity 86 formed on either side of the IR heater 52 is supplied with a flow of gas (e.g., air, nitrogen, etc.). Because the shroud 50, mounting bracket 48, and other components around the IR heater 52 are all indirectly heated when the IR heater is operating, the gas passing through the cavity 86 is heated as the gas flows over and around these heated structures. In other words, the gas, being at a temperature less than that of the heated structures, draws heat away from those heated structures and, to some extent, cools them.

Figure 5:
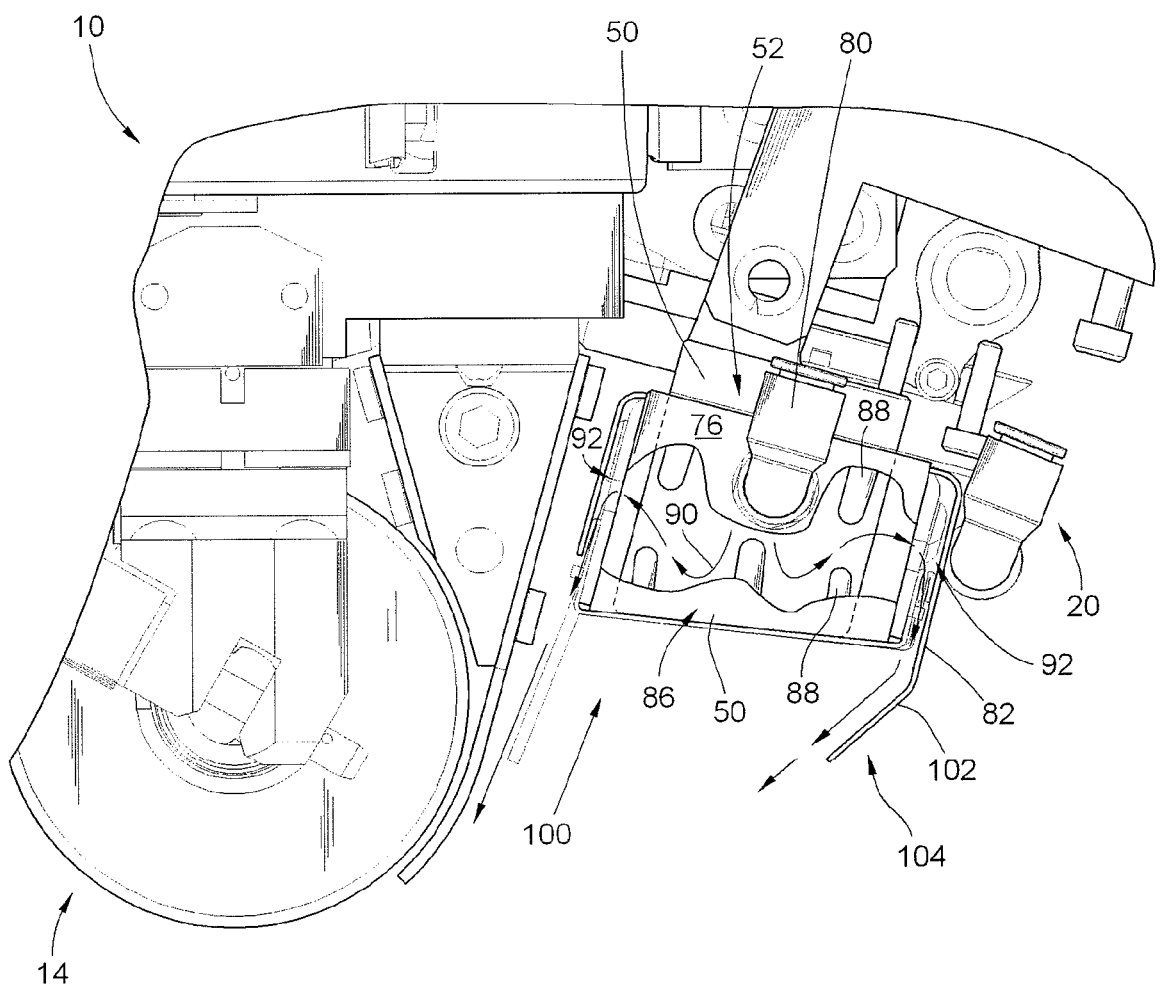
FIG. 5 is a side view, enlarged, partial cutaway illustration of the fiber placement head assembly of FIG. 4 showing details of an embodiment of a tortured path through the residual heat distribution assembly.

In one embodiment as illustrated in FIG. 5, the path of the gas flowing through the cavity 86 is manipulated by including a plurality of spacers 88 within the cavity. These spacers 88, which are tolerant to the heat generated by the IR heater 52 and radiated by, for example, the shroud 50, ensure that the gas flows along a predetermined path 90 (e.g., a tortuous path). Therefore, the gas is able to both effectively draw the heat out of the heated structures (such as the shroud 50) and cool those heated structures.

After circulating through the cavity 86, the gas encounters ports 92 formed through the side caps 76. In the illustrated embodiment, the ports 92 are formed through the left and right portions of the side caps 76 (as oriented in FIG. 5). The gas, which has now drawn heat away from the shroud 50 and other heated structures and become heated above the ambient as a result, exits the cavity 86 through these ports 92. Upon exiting, the gas encounters the secondary shroud 82.

The secondary shroud 82 is operably coupled to the IR heating assembly 18 and/or the fiber placement head assembly 10. As shown, the secondary shroud 82 is set apart from the side caps 76 and has an open end 100 generally facing toward the tool 32. Therefore, when the heated gas exhausted from the cavity 86 through the ports 92, the heated gas is encouraged to flow in the direction of the tool 32. In the illustrated embodiment, an end portion 102 on the lower region 104 of the secondary shroud 82 is angled inwardly toward the IR heater 52. Therefore, the heated gas impinges upon the tool 32 in an area somewhat in front of the compaction roller 28 when the compaction roller is engaged with the tool and increases the tackiness of the material (e.g., tows 34) laid down or applied in that area.

By using the heated gas to help heat the tool 32 or tows 34, the dynamic performance of the IR heating assembly 18 in this embodiment is changed. Indeed, using both the radiation heat transfer method from the IR heater 52 and the convection heat transfer method from the residual heat distribution assembly 74, the "intensity spikes" from the IR heater are mitigated and the potential for heating the tool 32 or tows above their burn point within a concentrated area is diminished. In other words, a more uniform distribution of heat is supplied to the tool 32.

Figure 2:
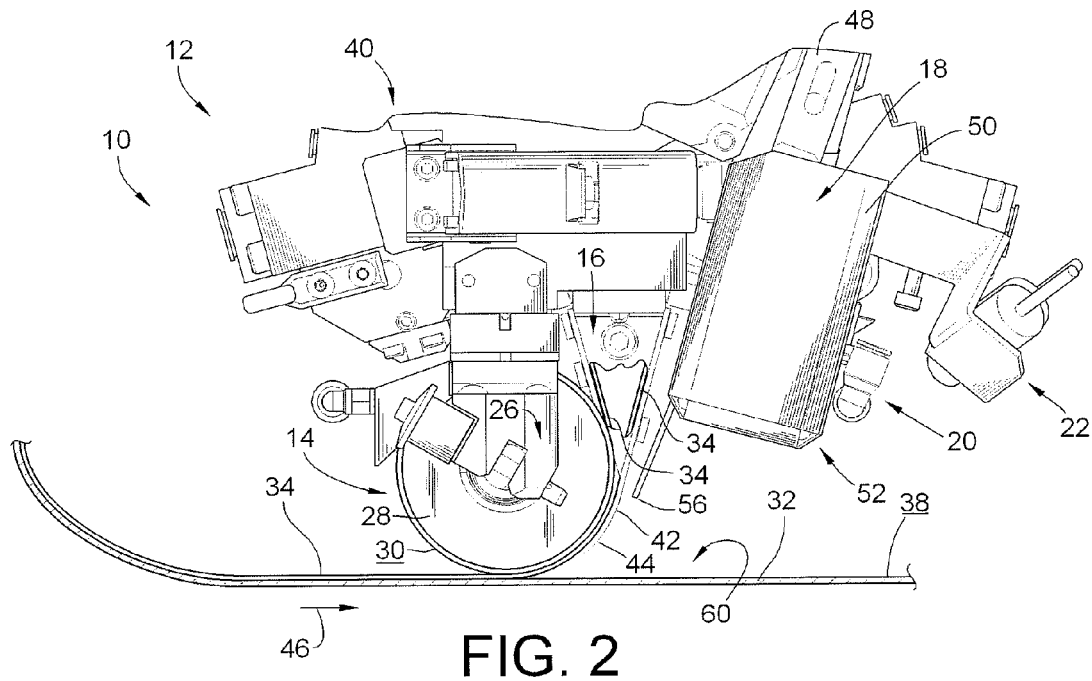
FIG. 2 is a side elevation view of the fiber placement head assembly of FIG. 1 including a residual heat distribution assembly disposed over the IR heating assembly.
Figure 3:
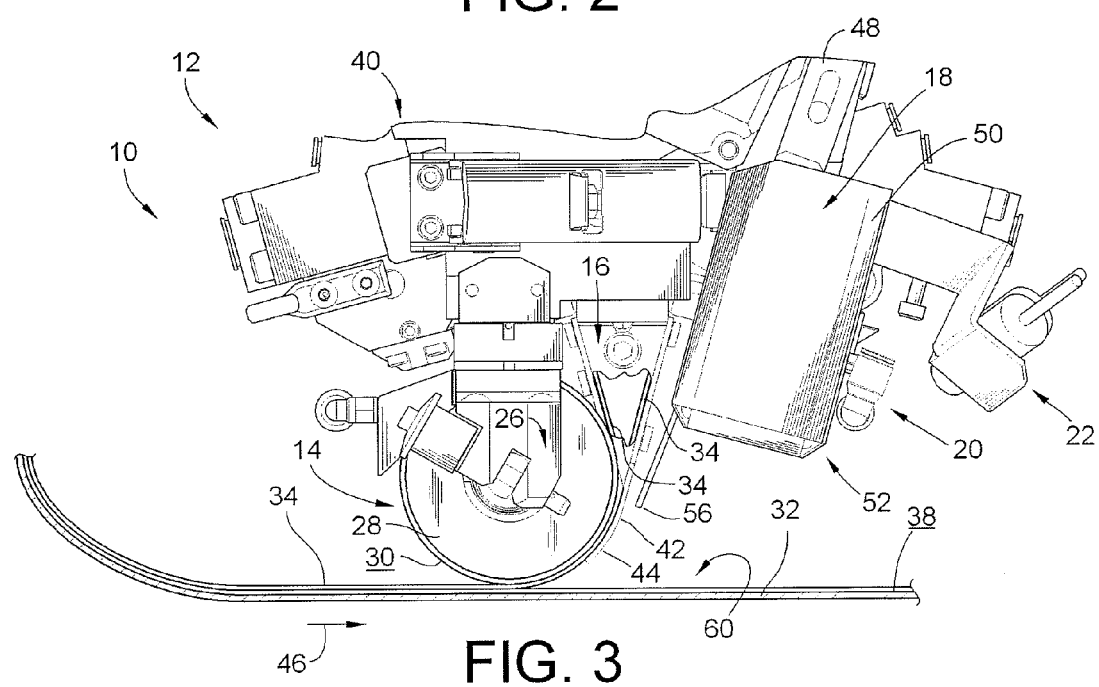
FIG. 3 is a side elevation view of the fiber placement head assembly of FIG. 1 laying down tows upon a tool.

Referring now to FIGS. 1-3, in operation the fiber placement head assembly 10, which is moveably supported by a gantry or other structure (not shown) of the fiber placement machine 12, is positioned proximate the tool 32. If the predetermined value representing the over temperature condition of the tool 32 and/or the tows 34 has not already been provided to the controller 24, that predetermined value is input into or provided to the controller. Then, the IR heater 52, the temperature sensors 22, and in one embodiment the residual heat distribution assembly 74, are activated by the controller 24. When this occurs, the IR heater 52 begins radiating heat such that the heating profile 58 is generated and the tool 32 is heated within the heating zone 60 (a.k.a., an application area).

As soon as the controller 24 receives a temperature reading from the temperature sensors 22 indicating that a portion of the tool 34 within the heating zone 60 has reached an appropriate temperature, the feeder assembly 16 begins to feed out the tows 34 and the fiber placement head assembly 10 begins to move in the tow application direction 46. As the fiber placement head assembly 10 moves, the tows 34 are laid down upon or over the tool 32 within the application area where the heating zone 60 used to be. The tows 34 are then compacted by the compaction roller 28.

As the fiber placement head assembly 10 moves relative to the tool 32, the IR heater 52, and in one embodiment the residual heat distribution assembly 74, continually generate a new heating zone 60 adjacent to the one now covered with tows 34. As the fiber placement head assembly 10 continues to move over and around the tool 32, further bands of tows 34 new portions of the tool 32 are radiantly heated by the IR heater 52 and, in one embodiment, the residual heat distribution assembly 74 to form new heating zones 60. In these newly formed heating zones 60 that transition on the surface 38 of the tool 32 as the tool moves, additional tows 34 are laid down upon the tool 32.

The process of heating a portion of the tool 32 immediately ahead of where the tows 34 will be laid down upon the tool 32 as the fiber placement head assembly 10 moves relative to the tool 32 continues until one "ply" or "course" of the tows 34 is laid down and covers some or substantially all of the tool. Thereafter, the fiber placement head assembly 10 generally repeats the above-noted process again, possibly in a different pattern and/or such that the tows 34 are oriented in a different direction than before. However, instead of radiantly heating the tool 32, the IR heater 52 and, in one embodiment the residual heat distribution assembly 74, now heat a portion of the previously laid tows in the first ply. As the fiber placement head assembly 10 moves relative to the tool 32, the portion of the previously laid tows within the heating zone 60 are radiantly heated by the IR heater 52 as shown in FIG. 4. As this continues, a second ply is built up upon the first ply. Additional plys or courses can be laid down, as desired, in different directions and orientations relative to the first ply until the composite part is complete.

As the tows 34 are being laid down in the manner noted above, the temperature sensors 22 monitor a surface temperature of either the heated area of the tool 32 or the heated portion of the previously laid tows 34, depending where in the composite part forming process the fiber placement head assembly 10 is at that time. If the controller 24 receives a temperature reading from the temperature sensors 22 that exceeds the predetermined value, an over temperature condition occurs.

When the controller 24 determines, based on the temperature readings delivered by the temperature sensors 22, that the predetermined value has been reached or exceeded and the over temperature condition is present, the controller simultaneously disables the IR heater 52, and in one embodiment the residual heat distribution assembly 74, and enables the cooling mechanism 20 by energizing the solenoid 64. The energized solenoid 64 opens the cooling mechanism 20 and allows, for example, ambient air to impinge either the area of the tool or the tows 34 residing within the heating zone 60. Therefore, the burn point of the tool 32 or tow 34 is not reached and the composite part being formed by the fiber placement head assembly 10 is not ruined. After the over temperature condition has been dealt with and any problem remedied, the heaters are once again turned on and the fiber placement head assembly 10 resumes laying down tows as before to finish forming the composite part.

From the foregoing, it will be recognized that a heating apparatus, system and method that may be used with a fiber placement machine to quickly heat a tool or previously laid tows within a heating zone and proximate a point of compaction is provided. As noted above, infrared radiation (IR) heat is supplied by an IR heater 52. Such a system and method is less expensive, quicker reacting, easy to control, and requires fewer assembly components than prior methods.

Commonly assigned provisional patent application Ser. No. 60/711,290, filed on Aug. 25, 2005, entitled "Compact Fiber Placement Head and Articulated Support Structure Therefor" describes one embodiment of a fiber placement head assembly to which the present invention has particular applicability. Therefore, the teachings and disclosure of that application are hereby incorporated in their entireties by reference thereto.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of heating at least one of a surface of a tool on which fiber tows are to be laid by a fiber placement head of a fiber placement machine and previously laid tows laid by the fiber placement head of the fiber placement machine on the surface of the tool, comprising the steps of:
    applying infrared radiation from an infrared heating assembly to at least one of the surface of the tool on which fiber tows are to be laid by the fiber placement head and previously laid fiber tows laid by the fiber placement head on the surface of the tool;
    flowing a gas over the infrared heating assembly to remove residual heat therefrom; and
    applying convective heat via the gas to at least one of the surface of the tool on which fiber tows are to be laid by the fiber placement head and previously laid fiber tows laid by the fiber placement head on the surface of the tool.

2. The method of claim 1, wherein the step of applying convective heat further comprises the step of:
    directing the gas along a tortuous path and thereafter directing the gas to at least one of the surface of the tool on which the fiber tows are to be laid by the fiber placement head and previously laid fiber tows laid by the fiber placement head on the surface of the tool.

3. The method of claim 2, wherein the step of flowing a gas comprises the step of flowing ambient air through the tortuous path surrounding the infrared heating assembly.

4. The method of claim 2, wherein the step of flowing a gas comprises the step of flowing nitrogen through the tortuous path surrounding the infrared heating assembly.

5. An apparatus comprising:
    a fiber placement head assembly;
    an infrared heating assembly operably coupled to the fiber placement head assembly and oriented to heat an area proximate the fiber placement head assembly by applying infrared radiation thereto; and
    a residual heat distribution assembly operably coupled to the infrared heating assembly, the infrared heating assembly including an infrared heater, the residual heat distribution assembly configured to convectively heat the area by flowing a gas over the infrared heating assembly and directing the gas to the area thereafter.

6. The apparatus of claim 5, wherein the residual heat distribution assembly includes a secondary shroud, the secondary shroud influencing the heating profile.

7. The apparatus of claim 5, wherein the residual heat distribution assembly forms a cavity within a cover and side caps and includes a quick connect, the quick connect coupling an air supply to the cavity.

8. The apparatus of claim 6, wherein the cover is spaced apart from the infrared heater by a plurality of spacers, the plurality of spacers forcing air flowing through the cavity to take a tortuous path.

9. An apparatus comprising;
a fiber placement head assembly operably coupled with and bearing an infrared heating assembly having a contoured primary shroud;
a residual heat distribution assembly in thermal communication with the infrared heating assembly forming a tortuous travel path for ambient air flow to remove heat from the infrared heating assembly to provide additional heating of at least one of a surface of a tool on which fiber tows are to be laid by the fiber placement head and previously laid fiber tows laid by the fiber placement head on the surface of the tool, the residual heat distribution assembly including a secondary shroud configured to direct the ambient air flow, heated from travel through the tortuous path, to at least one of the surface of the tool on which fiber tows are to be laid by the fiber placement head and previously laid fiber tows laid by the fiber placement head on the surface of the tool.

10. The apparatus of claim 9, wherein the residual heat distribution assembly further includes a pair of side caps positioned on either side of the infrared heating assembly, a cover mounted to, but spaced apart from, forward portions of the contoured primary shroud, and a pair of quick connects positioned each of the side caps on either side of the infrared heating assembly for supplying the ambient air flow to a cavity formed between the infrared heating assembly and the residual heat distribution assembly.

11. The apparatus of claim 10, wherein the residual heat distribution assembly further includes a plurality of spacers positioned within the cavity to form the tortuous travel path.

12. The apparatus of claim 9, further comprising a cooling assembly positioned and configured to provide cooling to at least one of the surface of the tool on which fiber tows are to be laid by the fiber placement head and previously laid fiber tows laid by the fiber placement head on the surface of the tool heated by the infrared heating assembly.

* * * * *

UNITED STATES PATENT AND TRADEMARK OFFICE
CERTIFICATE OF CORRECTION

| | | |
|---|---|---|
| PATENT NO. | : 7,731,816 B2 | Page 1 of 1 |
| APPLICATION NO. | : 11/675130 | |
| DATED | : June 8, 2010 | |
| INVENTOR(S) | : Tino Oldani et al. | |

It is certified that error appears in the above-identified patent and that said Letters Patent is hereby corrected as shown below:

Claim 1,
Line 16, after "previously laid", insert --fiber--.

Signed and Sealed this

Thirteenth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,731,816 B2                                                           Page 1 of 1
APPLICATION NO. : 11/675130
DATED : June 8, 2010
INVENTOR(S) : Tino Oldani et al.

It is certified that error appears in the above-identified patent and that said Letters Patent is hereby corrected as shown below:

Claim 1,
Column 10, Line 16, after "previously laid", insert --fiber--.

This certificate supersedes the Certificate of Correction issued July 13, 2010.

Signed and Sealed this

Seventeenth Day of August, 2010

David J. Kappos
*Director of the United States Patent and Trademark Office*